US006987577B2

(12) United States Patent
Wengender

(10) Patent No.: US 6,987,577 B2
(45) Date of Patent: Jan. 17, 2006

(54) PROVIDING A PARTIAL COLUMN DEFECT MAP FOR A FULL FRAME IMAGE SENSOR

(75) Inventor: Timothy G. Wengender, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 830 days.

(21) Appl. No.: 09/952,342

(22) Filed: Sep. 14, 2001

(65) Prior Publication Data

US 2003/0053142 A1    Mar. 20, 2003

(51) Int. Cl.
*G06E 1/06* (2006.01)
*H04N 1/00* (2006.01)
*H04N 9/64* (2006.01)

(52) U.S. Cl. .................. 358/1.14; 358/437; 348/246
(58) Field of Classification Search ............. 358/1.9, 358/504, 1.14, 437; 348/246–247, 187, 251, 348/241, 272–274, 280–282, 207, 222, 234–235

See application file for complete search history.

(56) References Cited

U.S. PATENT DOCUMENTS

| 3,971,065 | A | | 7/1976 | Bayer | |
| 6,181,376 | B1 | * | 1/2001 | Rashkovskiy et al. | 348/273 |
| 6,611,288 | B1 | * | 8/2003 | Fossum et al. | 348/246 |
| 6,819,358 | B1 | * | 11/2004 | Kagle et al. | 348/246 |

OTHER PUBLICATIONS

*Solid-State Imaging with Charge-Coupled Devices* by Albert J.P. Theuwissen.

\* cited by examiner

*Primary Examiner*—Kimberly Williams
*Assistant Examiner*—Charlotte M. Baker
(74) *Attorney, Agent, or Firm*—Raymond L. Owens

(57) ABSTRACT

A method for determining defects in an image sensor, which identifies one or more partial column defects, including capturing a digital image using the image sensor and storing such digital image in a memory; identifying at least one column in the digital image which has corrupted data caused by one or more defective pixels in the image sensor; processing the digital image data from the at least one identified column using an extended differentiation filter; and using the output of the extended differentiation filter to identify a starting position or an ending position of the partial column defect.

6 Claims, 4 Drawing Sheets

□ =NORMAL NON-DEFECTIVE PIXEL
☒ =DEFECTIVE PIXEL
? =UNKNOWN DEFECTIVE OR NON-DEFECTIVE PIXEL

PROVIDING A PARTIAL COLUMN DEFECT MAP FOR A FULL FRAME IMAGE SENSOR

FIELD OF THE INVENTION

The present invention relates to full frame image sensors and, more particularly, to the identification of partial column defects in such full frame image sensors to produce a defect map for concealing such defects.

BACKGROUND OF THE INVENTION

A full frame image sensor is basically a two dimensional array of pixel sensing elements of size x columns by y rows. The image sensors capture light and stores the light captured in the individual pixel sensors. The pixels are vertically shifted down each column in parallel by one row, with the last row being shifted out and filling a horizontal shift register. These pixels in the horizontal shift register are then shifted out one at a time (serially) until the horizontal shift register is completely empty. At this time, the sensor is ready to fill the horizontal shift register again, and the process of parallel to series shift explained above is repeated one row at a time until all rows of the sensor have been transported out of the sensor.

In typical high resolution image sensors, some of the pixels of the image sensing array provide corrupted data, which can be classified into three different types: pixel, column, and cluster defects. These defects are often characteristics of the device and are formed during the manufacturing process. The defects are typically mapped during the manufacturing process, but in some cases additional defects are also detected when the sensors are assembled into the final product, such as a digital camera. For example, the temperature or the clock and timing characteristics of the electronics controlling the sensor can cause additional defects. Also, during the product assembly, dust, dirt, scratches, etc. may be introduced.

With full frame image sensors, there is often a problem where there are one or more defective pixels in a column. Such a defective pixel will cause corrupted data in the digital image after it is read out of the image sensor. Depending on the cause of the defect, the column might be only partially corrupted. For example, the lower portion of the column could provide proper data while the upper portion provides corrupted data. To produce the highest quality image, this partial column defect needs to be identified, so that the data provided by the defective upper portion can be concealed, while the data from the lower portion is utilized to create the final image.

What is needed is a method of quickly and automatically identifying partial column defects in an image sensor, so that an effective map of the defective pixels can be provided.

SUMMARY OF THE INVENTION

It is therefore an object of the present invention to automatically determine the start and end points of a partial column defect in an image produced by an image sensor, such as a full frame image sensor, and to map such corrupted data so that it can be corrected in a digital camera.

This object is achieved by a method for determining defects in an image sensor, which identifies one or more partial column defects, comprising the steps of:

a) capturing a digital image using the image sensor and storing such digital image in a memory;

b) identifying at least one column in the digital image which has corrupted data caused by one or more defective pixels in the image sensor;

c) processing the digital image data from the at least one identified column using an extended differentiation filter; and d) using the output of the extended differentiation filter to identify a starting position or an ending position of the partial column defect.

ADVANTAGES

It is an important advantage of the present invention to provide a defect map of partial column defects, which can be used by a defect correction routine that will conceal defects.

It is an additional advantage of the present invention to quickly and accurately identify partial column defects.

DETAILED DESCRIPTION OF THE INVENTION

Figure 1:
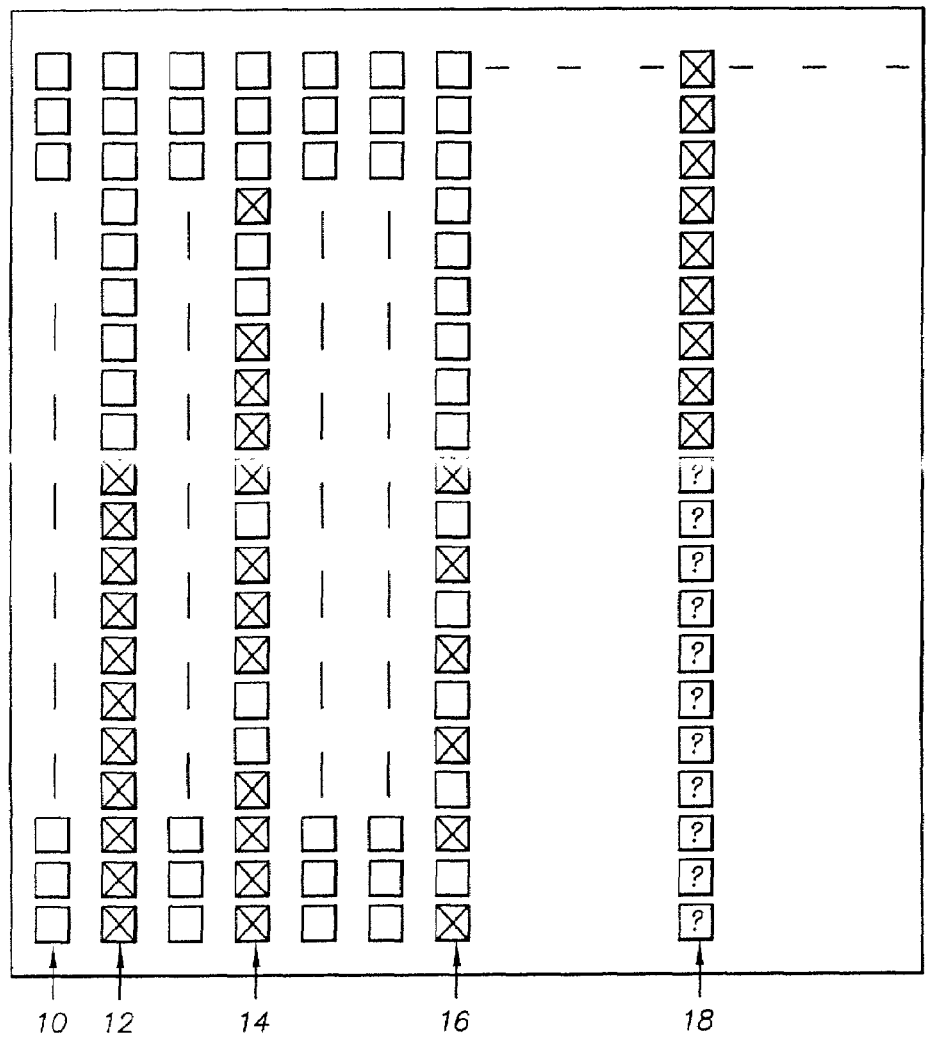
FIG. 1 is a schematic diagram that shows the types of column defects that can be found in a digital image produced by an image sensor.

FIG. 1 depicts a schematic diagram to represent the different types of column defects observable in an image sensor, such as a full frame image sensor. For a more detailed description of the operation and structure of CCD image sensors, refer to *Solid-State Imaging with Charge-Coupled Devices* by Albert J. P. Theuwissen.

FIG. 1 depicts an image sensor with both non-defective columns and partial column defects. A normal column with uncorrupted data 10 is classified as non-defective. There are basically two types of partial column defects observed in an image. First, the corrupted data may start anywhere (including the top) and end at the bottom of the observed digital image as shown by columns 12, 14, and 16. Second, the corrupted data may start at the top and "end" in the middle as shown by defective column 18.

The first type is common and can have several variations. When viewed in the observed digital image, the corrupted data can appear to start at a point and all subsequent pixels can appear corrupted at the same corrupted light level as shown in column 12. This can be caused by a pixel defect and/or channel restriction. This channel restriction or defective pixel causes the pixel of a column of a full frame sensor, and any subsequent pixel information that passes through such a restriction or defective pixel, to yield corrupted data in the output digital image. Corrupted data can also appear to fade in and out as shown in column 14. It is believed that a small charge trap in the shift register that skims charge from one or more pixels and later emits them causes this. Also, if the image sensor uses a color filter array (CFA), such as the Bayer CFA pattern shown in commonly-assigned U.S. Pat. No. 3,971,065, corrupted data can appear to be in one color plane only, as shown in defective column 16. This could be due to exposure conditions, and because of the channel restriction anomaly explained above, the light level in one of the color planes is being clipped and the resulting output image data in that color plane looks corrupted.

The second type of partial column defect, shown in 18, is uncommon and thought to be caused by a break (open circuit) in the lateral overflow drain (LOD). The LOD is supposed to drain excess electrons, but instead a portion of the LOD potential is floating and injecting charge along the column back into the pixels. Although this can be seen in the observed image as a partial corrupted column, the column could show up as a fully corrupted column, depending on exposure conditions. In certain exposure conditions, the pixel will not appear to be defective and in certain other conditions, the pixel will appear to be defective. Since the root cause of the defect is common to all the pixels in the column, it is better to map this type as a full column rather than as a partial column.

The present invention identifies all of these types of partial column defects and provides an appropriate defect map for concealing these defects.

Figure 2:
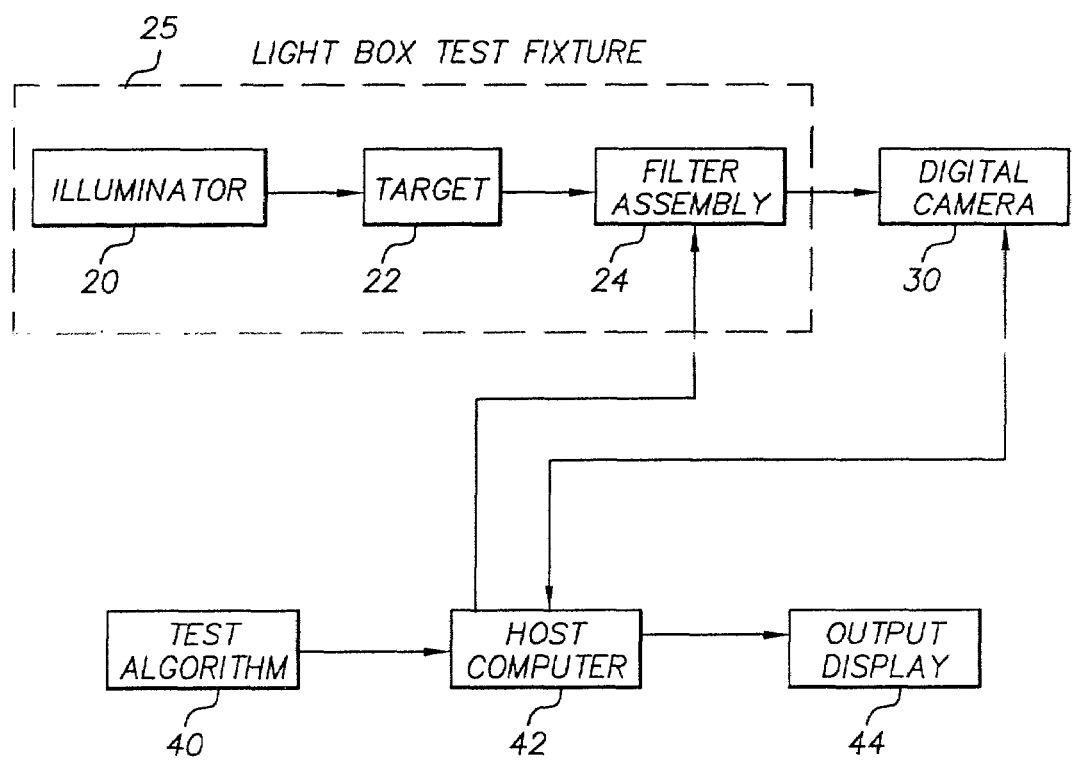
FIG. 2 is a block diagram of a test system for testing an image sensor in accordance with the present invention for automatically identifying corrupted data in a digital image and providing a defect map which can be used in a digital camera to correct such corrupted data.

Turning now to FIG. 2, a representative test system is used to acquire an image, process the image and identify corrupted data, and store the corrupted data back into the digital camera as a defect map. The test system includes an illumination source 20, which directs light through a transparent diffuse target 22 used to produce a flat field image. The light intensity is regulated through a filter assembly 24 including several neutral density filters. Filter selection is controlled by a host computer 42. Parts 20, 22, and 24 are all enclosed in a light box test fixture 25 to block unwanted light interference from the outside. The flat field image produced in the light box test fixture 25 is captured and processed by a digital camera 30 (described later). The digital camera 30 is automatically controlled by the host computer 42. The host computer 42 controls both the capture and retrieval of the image from the digital camera 30 via an electrical interface, such as one made in accordance with the well-known IEEE 1394 standard.

Once the image has been retrieved from the digital camera 30, a test algorithm 40 (described later), which has been input to the host computer 42 prior to the beginning of the test, is used to process and analyze the image. The host computer 42 determines the defect map according to the test algorithm 40 and lists the results on the output display 44. A defect map is also sent and stored in the digital camera 30.

Figure 3:
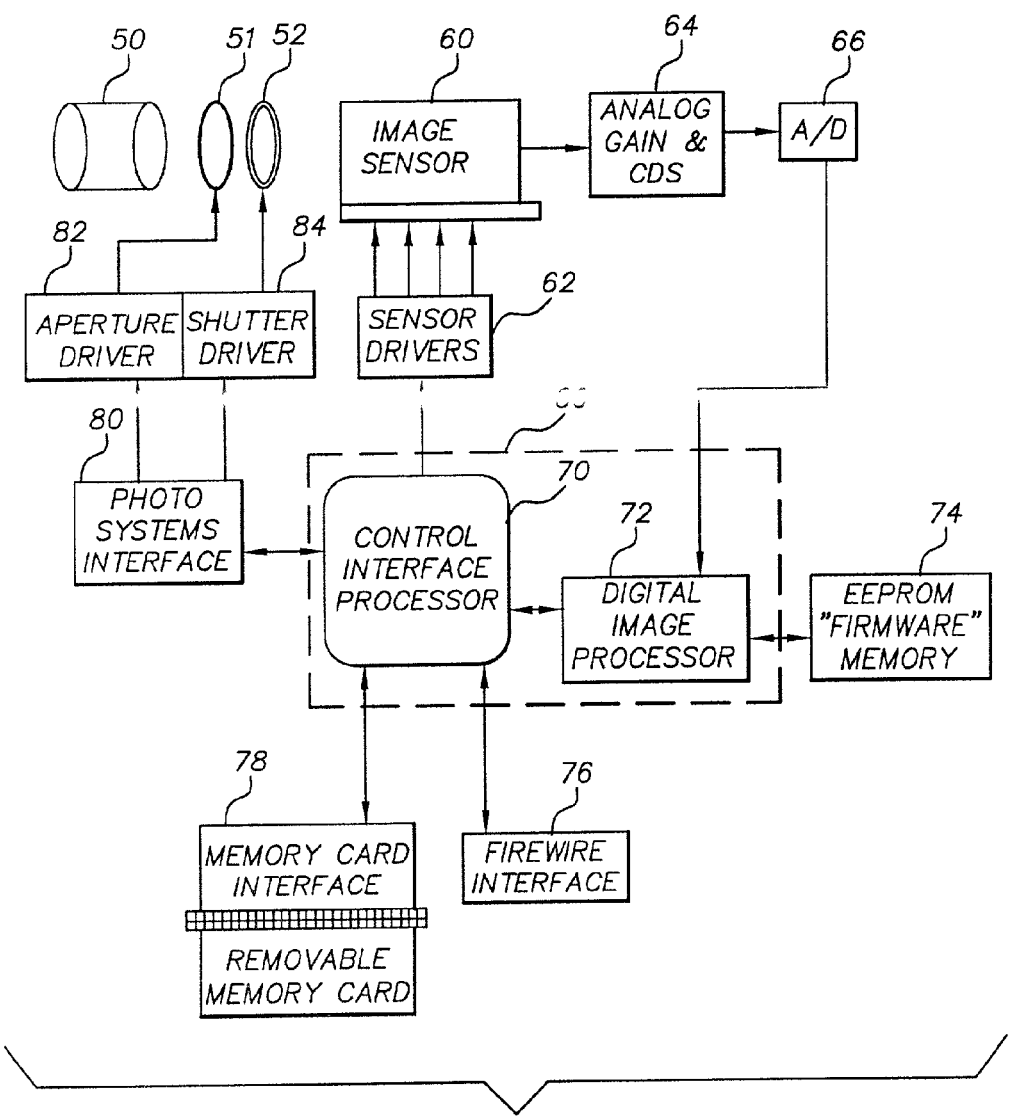
FIG. 3 is a block diagram of a digital camera, which can be used to capture the image as shown in the test system of FIG. 2, and also store the defect map as created by the algorithm of FIG. 4.

FIG. 3 depicts a block diagram of a digital camera used to capture an image produced by the test system of FIG. 2 described above and store the defect map produced by test algorithm of FIG. 4 (described later). As stated above, the host computer 42 automatically controls the operation of the digital camera 30. The host computer 42 sends the digital camera a series of commands via firewire interface in accordance with the IEEE 1394 standard. The control interface processor 70 interprets these commands and in turn sends commands to a photo Systems interface 80, which sets the exposure control parameters for the digital camera 30. Connected to the photo systems interface 80 are an aperture driver 82 and a shutter driver 84. The camera includes an optical lens 50, which receives the incoming light. Through the aperture driver 82 and the shutter driver 84, aperture 51 and shutter 52 are controlled, respectively, and allow the incoming light to fall upon the full frame image sensor 60. The image sensor 60, which may be a KAF-6303E image sensor manufactured by Eastman Kodak Company, Rochester, N.Y., is clocked by the sensor drivers 62. The output of the image sensor 60 is amplified and processed in a CDS (correlated double sampling circuit) 64 and converted to a digital form in an A/D converter 66. The digital data is transferred to processor section 69, which includes a digital image processor 72 that utilizes instructions stored in EEPROM firmware memory 74 to process the digital image. Finally, the processed digital image is stored using a memory card interface and removable memory card 78, which can be made in accordance with the PCMCIA 2.0 standard interface, or the image is transferred back to the host computer 42 shown in FIG. 2 via the firewire interface 76.

The present invention provides an automated test method for effectively detecting the endpoints of partial column defects in the image sensor 60. FIG. 4 depicts a flowchart of a preferred embodiment of a test algorithm for operating the system of FIG. 2 to detect partial column defects. Referring to the flowchart of FIG. 4, the test starts in block 90 when the digital camera 30 is connected to the host computer 42, and properly positioned relative to the light box test fixture 25.

In block 92 an image is captured with the digital camera 30 with a full frame sensor on a flat field target. Also in block 92 the image is transferred from the digital camera 30 as described above to the host computer 42 where the analysis of the image takes place. As discussed earlier in reference to FIG. 1, there are several different causes and sources of column defects which can cause the defective columns to be brighter or darker than the surrounding image. For this reason, it is preferred to have several images taken at different exposure levels, each one to be analyzed separately. Typically a low, mid-range, and high exposure image for each gain setting (e.g each effective ISO setting) of the camera is sufficient. The final defect map includes the defective partial column defects identified for each of these exposure levels.

In block 94, the host computer 42 performs an algorithm to identify and store the column addresses of full column defects in the transferred image. A preferred algorithm for identifying the defective columns is to compare the mean average of each column to its neighbor. By comparing the mean average of each column to the mean average of three neighboring non-defective columns, the relative error is calculated using the formula:

$$\delta = (X0 - X)/X \qquad \text{(equation 1)}$$

wherein:

δ is the relative error;

X0 is the mean average of column being tested; and

X is the mean average of 3 neighboring good columns.

This relative error is then compared to a threshold to determine whether or not the column has corrupt data in it. If the relative error is above a limit threshold, which is typically around 10 percent in the preferred embodiment, but will vary depending on gain setting (effective ISO speed), exposure level, and camera type, the column is marked as defective and the column address is stored for later analysis. In this manner, the column addresses of all columns containing partial column defect columns are identified and stored. At this stage, all the columns have unknown endpoints. It is the job of the rest of the algorithm to determine the endpoints.

In block 96, after a defective column list is obtained, the first column array of pixels is extracted. Since the image sensor 60 has a Bayer CFA pattern and the color pixel values have not been interpolated, there will be two color planes for each column extracted, which will be either a green plane and a red plane, or a green plane and a blue plane. Each color plane will be a separate array of data, corresponding to the odd and even rows of the image sensor array.

In block 98, one of the two color planes for the identified column is retrieved from memory by the host computer 42 so that the image data for that color record in the identified column can be processed.

In block 100, a median filter is performed on the array. This helps reduce noise and eliminates any pixels that deviate greatly from the others. In the preferred embodiment, the median filter performs the following operation:

$$Y[i] = \text{Median}\{X[i-r], X[i-r+1], \ldots, X[i], \ldots, X[i+r-1], X[i+r]\} \quad \text{(equation 2)}$$

wherein:
Y is output median filtered pixel data array;
i is index of array;
X is input pixel data array; and
r is filter rank;
wherein the median is defined as the middle element in a sorted array.

In the preferred embodiment the filter rank r is 3. Using equation 2 above, when r equals 3, then each pixel element i has a median filter performed on it using an array subset X of size 7.

In block 102, the median filtered column image data is processed using an extended differentiation filter. An extended differentiation filter is a class of filters that has been found to be particularly suited for identifying the starting and ending locations of partial column defects. Unlike a discrete derivative function given by the relationship:

$$dp(i)/dy = *dy(p(i+1) - p(i-1)) \quad \text{(equation 3)}$$

wherein:
dp is rate of change of p;
i is index of array;
dy is rate of change of y; and
p is the input pixel data, an extended differentiation filter uses the mean average of a plurality of pixels, rather than just a single point, wherein the plurality of pixels provides a filter of width x in equation 4 below.

The formula for a preferred form of the extended differentiation filter is given by the equation:

$$dp(i)/dy = *dy(\mu[p(i+1, i+2, \ldots i+x)] - \mu[p(i-1, i-2, \ldots i-x)]) \quad \text{(equation 4)}$$

wherein:
dp is rate of change of p;
i is index of array (corresponding to every other of the sensor array, since the processing is performed one color plane);
dy is rate of change of y;
p is the pixel data following median filtering;
$\mu$ is mean average; and
x is constant value equal to the filter width.

An advantage of using an extended differentiation filter is that it smoothes out the signal, which in many images is quite noisy and which would otherwise provide an unreliable indication of the starting and ending points of the partial column defects. While the preferred width x for the KAF-6303E sensor having 2056 rows is 50 pixels, in general, the width of the filter depends on the number of pixels in the array, the magnitude of noise in the image, and the signal-to-noise ratio of the array of data. The minimum width possible is desired because pixels that do not have the required width will be set to zero so as to minimize errors in the resulting differentiation. The pixels set to zero are enforced at the edges of the column, or in other words the ends of the array, where the pixels do not have the required filter width on either side. This is the safest method for dealing with edge pixels. Performing an erroneous calculation could potentially determine an inaccurate start point within the defective column.

It should be noted that from an image quality standpoint, it is worse to map not enough of the column rather than too much. For example, the actual starting point of the partial column may be in the middle or top of the image. If the extended differentiation filter determines this starting point to be near the edge at the bottom, some of the corrupted data will not be mapped and will be obvious when rendered in a final image.

In step 103, the row address of the maximum value of the output of the extended differentiation filter is captured and stored as the tentative starting point of the partial column defect. The next step is to determine whether or not this tentative starting point is valid, and if so, which part of the column is defective.

In order to do this, a comparison with a good neighbor column is performed in block 106. Two mean averages of a good neighbor column and two mean averages of the defective column of a given width of pixels (using an averaging filter similar in size to the extended differentiation filter used in block 102), before and after the starting point, are determined.

The preferred averaging filter is given by the equation:

$$\mu = \text{Sum}\{X[i]/n\} \quad \text{(equation 5)}$$

wherein:
$\mu$ is mean average;
i is index of array;
X is the input pixel data array after median filtering; and
n (filter width) is number of pixels in X.

Defining the tentative starting point as i0, X is pixel data from i0+1 to i0+n for the first mean average and i0−1 to i0−n for the second mean average.

Two relative errors are then calculated in block 104 using equation 6, using as inputs the mean average values just calculated using equation 5, wherein $$\delta = (X0 - X)/X \quad \text{(equation 6)}$$

wherein:
$\delta$ is the relative error;
X0 is the mean average of the given width of pixels of the defective column; and
X is the mean average of the given width of pixels of the good column.

Note that the comparison is done on the mean averages of the columns. Two relative errors are calculated. The first compares the mean average of a good column before the starting point to the mean average of a defective column before the starting point, and the second compares the mean average of a good column after the starting point to the mean average of a defective column after the starting point. Relative error measurements need to be used rather than absolute error due to the non-uniformity introduced from the test system of FIG. 2. Non-uniformity is introduced with lens roll-off or light source impurities, and for practical applications the flat-field image created is not truly "flat-field".

In block 106 the relative errors are compared with a threshold to determine whether the difference between the good column and defective column is large enough to constitute a defect. This threshold is equal in value to the one used in detecting the column defect of equation 1 above.

If the relative errors are not greater than the threshold, then an edge real flag for this color plane is cleared in block 112. The use of this edge real flag will be described later in reference to block 120.

If the relative error is greater than a threshold, then an edge real flag is set in block 108 for this color plane and the relative error before the starting point and after the starting point are compared in block 110.

If the relative error before the starting point is not less than the relative error after the starting point, the column defect starts from the top as indicated in block 114. As discussed earlier in the discussion of FIG. 1, all partial columns starting from the top edge must be recorded as full columns because any other endpoint would be unreliable.

If the relative error before the starting point is less than the relative error after the starting point, the column defect starts from the starting point and ends at the bottom as indicated in block 116. The endpoints for this color plane of the first identified defective column have now been determined and recorded in the memory of the host computer 42.

As shown in FIG. 1, it is possible to have a defective column 16 in only one color plane. For a Bayer pattern there are two color planes to analyze for each column of pixels, therefore in block 118 this is not the last color plane and the process described above for getting a color plane and analyzing to determine the endpoints is repeated for the second color plane of the first identified defective column.

After it has been determined that the last color plane has been analyzed in block 118, the maximum size column may be calculated and recorded to the defect map in block 120. This is done by comparing the endpoints from the color planes that have their edge real flag set. If only one of the color planes has its edge real flag set, then the endpoints from that color plane are recorded. If both color planes have their edge real flags set, then the maximum end point and minimum start points are recorded to provide the row addresses of the longest column. If both color planes have their edge real flags cleared, then the column is recorded as a full column defect.

In block 122, the program then checks to see if this is the last defective column, and if not continues on to the next column repeating the process starting at block 96. Finally, after the last column has been analyzed in block 122, the test finishes in block 124. At this point, a final defect map with all the columns and their respective endpoints has been recorded and stored in the memory of the host computer 42 of FIG. 2. The defect map is now transferred from the host computer 42 to the digital camera 30 and stored in the EEPROM firmware memory 74.

Figure 4:
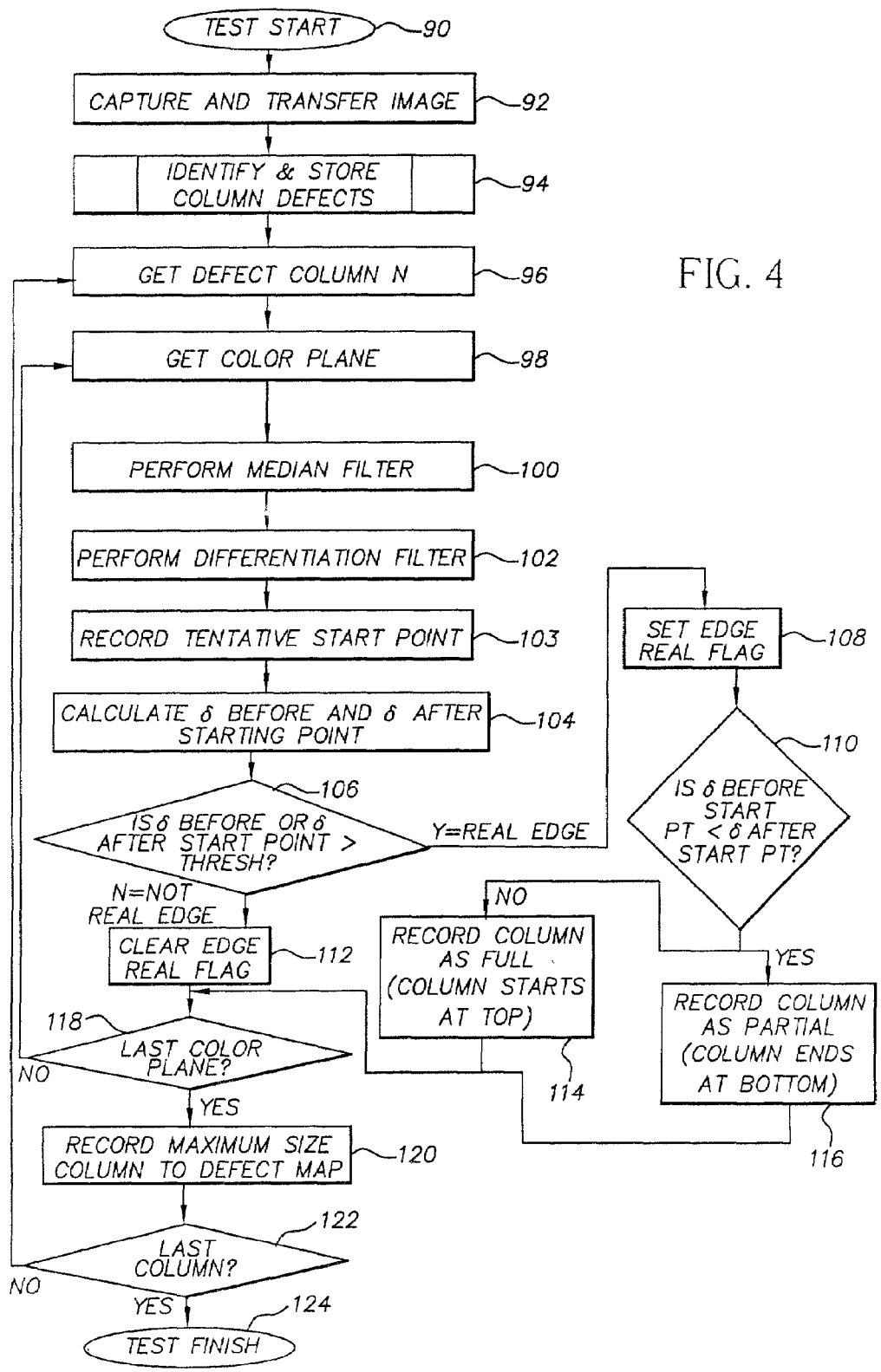
FIG. 4 is a block diagram of the algorithm used in the system of FIG. 2 for producing the defect map.

As described relative to FIG. 4, the present invention first identifies the column defects (block 94), and then processes the digital image data from the identified column using an extended differentiation filter (block 102), and uses the output of the extended differentiation filter to identify starting or ending positions (block 103) of the partial column defect. Partial columns are assumed to have one endpoint at the bottom or top. If the image sensor has a partial column that neither begins at the top nor ends at the bottom, then the partial column defect identified using the algorithm described provides a column defect map that provides concealment of a larger column, by extending defect to the bottom of the image sensor array.

A computer program product, such as a readable storage medium, can store the programs in accordance with the present invention for operating the methods set forth above. The readable storage medium can be a magnetic storage media, such as a magnetic disk (such as a floppy disk) or magnetic tape; optical storage media, such as an optical disk, an optical tape, or a machine readable bar code; solid state electronic storage devices, such as a random access memory (RAM) or a read only memory (ROM); or any other physical device or medium employed to store computer programs.

The invention has been described in detail with particular reference to certain preferred embodiments thereof, but it will be understood that variations and modifications can be effected within the spirit and scope of the invention.

PARTS LIST 10 normal column
12 partial column defect
14 partial column defect
16 partial column defect
18 partial column defect
20 illuminator
22 target
24 filter assembly
25 light box test fixture
30 digital camera
40 test algorithm
42 host computer
44 output display
50 optical lens
51 aperture
52 shutter
60 image sensor
62 sensor drivers
64 analog gain and CDS
66 A/D converter
69 processor section
70 control interface processor
72 digital image processor
74 EEPROM firmware memory
76 firewire interface
78 removable memory card and interface
80 photo systems interface
82 aperture driver
84 shutter driver
90 block
92 block
94 block
96 block
98 block
100 block
102 block
103 block
104 block
106 block
108 block
110 block
112 block
114 block
116 block
118 block
120 block
122 block
124 block

What is claimed is:

1. A method for determining defects in an image sensor, which identifies one or more partial column defects, comprising the steps of:
    a) capturing a digital image using the image sensor and storing such digital image in a memory;
    b) identifying at least one column in the stored digital image which has corrupted data caused by one or more defective pixels in the image sensor;
    c) processing the digital image data from the at least one identified column using an extended differentiation filter; and
    d) using the output of the extended differentiation filter to identify a starting position or an ending position of the partial column defect.

2. The method of claim 1 further including the step of:
    e) providing a defect map which identifies the position of the defective column and the starting or ending position of the partial column defect, so that such defect map can be used in a digital camera to correct the partial column defect.

3. The method of claim 1 wherein the output of the extended differentiation filter is compared to a threshold determined from the digital image data of at least one neighboring column which does not include defects.

4. The method of claim 3 wherein step c) includes median filtering the digital image data from the at least one identified column prior to processing the digital image data using the extended differentiation filter.

5. The method of claim 4 wherein the image sensor is a color image sensor, and step c) is performed on the separate color plane image data of the at least one identified column.

6. A computer program product comprising a computer readable storage medium having a computer program stored thereon for implementing the method of claim 1.

* * * * *